United States Patent [19]

Jenab

[11] Patent Number: 4,714,376
[45] Date of Patent: Dec. 22, 1987

[54] HILLSLOPE LANDSLIDE STABILITY DRAIN

[76] Inventor: S. Abdollah Jenab, 1289 North 400 East, #3, Logan, Utah 84321

[21] Appl. No.: 687,652

[22] Filed: Dec. 31, 1984

[51] Int. Cl.$^4$ .................... E02B 11/00; E02D 3/10
[52] U.S. Cl. ........................................ 405/45; 405/36; 405/50; 405/258
[58] Field of Search .................. 405/15, 36, 38, 43, 405/50, 51, 258, 44–49, 184

[56] References Cited

U.S. PATENT DOCUMENTS

| | | |
|---|---|---|
| 245,721 | 8/1881 | Henning . |
| 354,276 | 12/1886 | Valentine . |
| 599,719 | 3/1898 | Manning . |
| 870,433 | 11/1907 | Hodges . |
| 901,582 | 10/1908 | Austin . |
| 1,129,324 | 2/1915 | Appelman ........................ 405/45 |
| 1,151,608 | 8/1915 | Paech . |
| 1,866,826 | 7/1932 | Strothmann . |
| 1,875,395 | 9/1932 | Salisbury ......................... 405/48 |
| 2,136,151 | 11/1938 | Parrish ............................ 405/49 |
| 2,383,496 | 8/1945 | Nebolsine ..................... 405/184 X |
| 2,514,509 | 7/1950 | O'Neal . |
| 2,653,449 | 9/1953 | Stauch ............................ 405/45 |
| 2,789,399 | 4/1957 | Finn . |
| 3,625,010 | 12/1971 | Hakundy ......................... 405/38 |
| 3,822,556 | 7/1974 | Cramwinckel et al. ......... 405/270 |
| 4,045,964 | 10/1977 | Barclay . |
| 4,061,272 | 12/1977 | Winston .......................... 405/45 |

FOREIGN PATENT DOCUMENTS

| | | | |
|---|---|---|---|
| 0143007 | 9/1982 | Japan ............................ 405/45 |
| 150224 | 10/1931 | Switzerland .................. 405/50 |
| 712481 | 11/1976 | U.S.S.R. . |
| 746031 | 10/1978 | U.S.S.R. . |

Primary Examiner—David H. Corbin
Attorney, Agent, or Firm—Trask, Britt & Rossa

[57] ABSTRACT

A drain system for use in hillsides for preventing or remedying landslides is provided. The system includes a porous walled conduit positioned within the hillside substantially parallel the face of the hillside, i.e. tangent the contour lines of the hillside. The system may include a saddle section or chamber which essentially surrounds the conduit and provides a region of increased permeability contiguous the conduit. A second high permeability region configured as an upper extension or neck, positioned superior to the conduit, is also provided. An apron positioned adjacent the conduit functions to prevent water from moving beyond the vertical axis of the conduit. Means for installing the drain system are also disclosed.

18 Claims, 17 Drawing Figures

HILLSLOPE LANDSLIDE STABILITY DRAIN

BACKGROUND OF THE INVENTION

1. Field

This invention relates to systems of drainage, specifically those directed to accumulations of ground water, rainfall and snow melt. More particularly, this invention is directed to systems for stabilizing hillsides through means of internal drainage thus preventing or remedying landslides or similar occurrences of said hillsides. Furthermore, the invention relates to the restoration of the stability of the hillside.

2. State of the Art

Landslides cause millions of dollars of damage and threaten hundreds of lives each year in various parts of the world. Excess water accumulation is one of the major causes of landslides and mud flows. Various methods for addressing this problem have been attempted over the years. Landslides, especially those which are water or fluid related, result when a substantially downslope directioned force, i.e. driving force, acting on the material constituting the hill face exceeds the substantially upslope directioned force, i.e. resistant force, acting to support that material in its initial position. This relationship between the driving force and resistant force may be expressed mathematically as:

$$F_S = \text{Resistant Force/Driving Force}$$

where $F_S$ is defined as the factor of safety. When $F_S$ achieves a value less than one (1), a landslide potentiality is produced. The resistant force is composed of the forces of cohesion between the particles of the hillside material composition and the forces resulting from friction between the soil particles. The driving force is primarily a result of the force of gravity acting on the mass of material constituting the hill face material.

When the hill face material is permitted to become water soaked or saturated, the factor of safety is lowered in value. Excess water adversely affects the factor of safety in two different ways;

1. The mass of the hill face material is increased due to the added mass of the water, thereby increasing the magnitude of the driving force.
2. The resistant force is diminished in magnitude as cohesion and the frictional coefficient are both reduced in value.

One method of preventing landslides, especially those which are water or fluid related, is to attempt to limit the water concentration in the hillside material to a level in which the factor of safety as defined is equal to or greater than one (1).

In areas where excess water is the main cause of landslides, conventional horizontal-type drains are presently used to stabilize hillsides. These horizontal drains have been used since as early as the 1930's to remedy this hazardous phenomena. Horizontal drains are installed normal to the surface of the hillside, i.e. parallel to the groundwater flow nets. Since the pipes are laid parallel to the underground flow nets, they are not hydraulically efficient in removing the ground water and maintaining the slope stability. Such horizontal drains are typically small in cross-section, measuring typically in the range of ½" to 2" in diameter. The pipes are typically perforated and jetted normally into the hill face. In the conventional practice, no filter is used for such horizontal drains, and the perforations being small, necessarily are very susceptible to ferrous oxide clogging. Furthermore, the pipes clog up rapidly due to the small amount of silt entering the pipe. These conditions result in a limited durability as well as a relatively short use life for horizontal drains.

Since the horizontal drains are installed normal to the face of the potential landslide site, it is dangerous to effect their construction while the slide is occurring. Typically, horizontal drain construction must either await the stabilization of the hillside or be installed prior to a slide occurrence.

Horizontal drainage systems are also very dependent upon the particular soil or geological formation of the hillside. In heavy clay formations, since the permeability of the soil is very low, horizontal drains have limited effectiveness. In hillsides composed of fractured rocks where the cracks are randomly scattered, small cross-sectional pipe drains fail to intercept all the cracks in the ground water flow. Therefore, they also have limited effectiveness in dewatering the hillside. In massive semipermeable formations, when heavy precipitation occurs, horizontal drains are not able to remove penetrated water fast enough. This results in a rapid mud flow and/or landslide.

Layered soil formations, wherein the silt and sand are embedded in clay layers, also frustrate the operation of horizontal drains. Oftimes, these drains are unable to satisfactorily convey water from the various layers. Typically the problem is avoided by layering the drains in every possible lenses of permeable strata. Understandably, this procedure increases the cost of the project tremendously.

The installation of horizontal drains typically involves the use of a fluid medium to remove the bored particles produced in drilling the housing for the drain. In non-cohesive soils; e.g., sandy soils, silt loam soils or silty soils, when fluid is introduced to carry away the bored particles, the fluid may flow between the pipe and the wall of the bored hole. This fluid flow causes washouts and/or cave-ins often resulting in the collapsing of the bored hole.

In practice, the limited effectiveness of conventional horizontal drains in depressing the phreatic water table (or removing excess water) to maintain slope stability has necessitated the supplementation of those drains with other geotechnical structures. Typical geotechnical structures of this type may include retaining walls, buttresses, and similar constructions. These constructions are usually installed at the surface of a slide area. The necessity of supplementing the drains with such structures often escalates the cost of the drainage system beyond feasible economics.

SUMMARY OF THE INVENTION

A system according to this invention includes a drain conduit positioned within the interior of a hillside, so as to be substantially parallel to the face of the hillside, i.e. the conduit is positioned essentially tangent to the contour lines of the face of the hill. The term "tangent" as used herein connotes a line segment which is perpendicular to the radius of curvature of the particular curve referenced. In the case of the referenced curve being a straight line, the tangent line segment is defined as being parallel or congruent to that straight line. The conduit is adapted with means of receiving into the interior thereof fluid from without the conduit and thereafter conducting that fluid along a predetermined path. Typically, this conduit means is a cylindrical drain pipe adapted with perforations therein for receiving moisture or fluid from the environment, i.e. the mass of soil inside the hillslope.

Due to the orientation of the drain conduit, the ground water flow is generally normal to the longitudinal axis of the conduit drain. Not only does this particular positioning make the drainage phenomena hydraulically very efficient, but furthermore, in contrast to the conventional practice, the instant invention may typically require only one drain pipe. The conduit is positioned within a hillside identified as a potential landslide situs. Generally, the conduit is located remote from the toe of the hillside surface and within a zone of water saturation. Typically, the conduit is oriented within the hillside so as to be above an impermeable geological strata of the hill and below the phreatic water surface. In the event the hill has no impermeable strata, the conduit is positioned above an imaginary line which intersects the toe of the hill. In the case wherein no definite phreatic water table is present, the conduit is placed within the zone of water saturation. The depth of the conduit within the hill is determined in part by the soil composition of the hill, amount of ground water flow and location of impermeable layer. Typically, the drain is located remote from the face of the hillside and beyond any anticipated slough lines.

The drain conduit may include an essentially superior positioned saddle section which substantially encircles the conduit. In a typical construction, the saddle section is a cylindrical hollow chamber dimensioned to receive the conduit therein while allowing a substantial spacing between the conduit and the walls of the chamber. The saddle section is extended over substantially the full length of the conduit. The saddle section may be adapted with filtering means so as to process the ground water entering the drain conduit.

The saddle section may be adapted with a superior positioned extension or neck which may extend approximately in a direction inclined from the vertical. Alternately, the neck may be constructed to be essentially vertically, or uprightly, positioned. In construction, the conduit, saddle section and neck assembly presents in cross-section a bud vase-like configuration, which cross-section typically remains constant over substantially the total length of the drain system. The neck of the bud-vase is dimensioned so as to not reach the hill face. This dimensional requirement functions to maintain the anchorage between the hill face and the rest of the hill formation.

The saddle section and the neck may be defined by the walls of a cavity drilled out of the hillside to house the conduit. In a preferred construction, the cavity is filled with various sized sand and gravel particles which produces a region of increased permeability surrounding the conduit itself. This region directs a rapid flow of fluid from the region into the conduit and thus facilitates a rapid drainage of the vicinity immediate the region. The particle filled saddle section also effects a filtering process thereby preventing a clogging or a silting over of the conduit.

The drain system may also include an apron in conjunction with the saddle/neck section assembly. This apron is typically a bifurcated structure having a permeable layer together with an impermeable layer. The apron is typically positioned in a manner either inclined from the vertical or vertical. The apron is placed contiguous to the saddle of the drain system, with the permeable layer in close proximity to the saddle itself. The apron operates to channel any ground water received within the environment of the saddle into the drain conduit. Furthermore, the apron functions to restrict water flow beyond the drain system; i.e., toward the hillface.

The invention may also include a network of surface collector drains positioned over the targeted hillside and tangent to the hill face contour lines, facilitating a draining of surface water before that water is permitted to soak into the soil or the material constituting the hillside. This network may include a flexible, fluid-impermeable sheet adapted for positioning over the hillside. Alternately, a series of surface drainage channels may be cut into the hillside. The impermeable sheet is preferably located over the hillside face and that portion of the crown of the hillside which may be expected to slough off. Preferably, the sheet is extended some distance beyond the hillface and crown of the hillside.

The invention also anticipates a method of positioning the system to accomplish the draining function. The installation of a system in accordance with the present invention contemplates a drilling unit, including bits adapted for drilling holes in rock, soil or other types of material typically found constituting a hillside. The drilling unit is supported by auxilliary pipe-like structure which serves to surround a fluid-injecting power-transmitting central section. This central section operates not only to power the drilling means, but also facilitates a fluid-aided removal of soil and rock particles generated by the drilling. The installation means also contemplates the use of a solid-walled pipe retaining structure which isolates the bored hole, prevents cave-ins or the introduction of hillside material into the bored hole and facilitates the transport of drilling debris out of the bored hole. After the hole is drilled, the central section is retracted and the drain conduit is inserted within the hollow of the interior of the solid-walled pipe. Thereafter the solid-walled pipe is removed.

The installation of a saddle section surrounding the drain conduit is accomplished in a manner similar to that utilized in installing the drain conduit; i.e., the dimensions of the bored hole housing the drain conduit may be enlarged so as to define essentially a saddle section surrounding the conduit. A saddle filter may be constructed as follows. First, a small diameter drilling mechanism is inserted into the hillside to bore a hole superior to that housing the conduit. After the drilling has been accomplished and the fluid rod is taken out, an augerlike means is introduced into the bored hole to place the filter material over and around the drain conduit thereby constructing the saddle section filter. In some embodiments the bored hole may remain without a filter, essentially defining a chamber or extended neck above the drain conduit. Various configurations of this chamber are within contemplation though in all configurations the height of the neck is limited so as to not intercept the hill face. This height restriction maintains the anchorage and cohesion between that portion of the hill immediately superior to the chamber and the remainder of the hill. The height of the neck depends on the permeability of the formation, extent of the cracks and location of the embedded sand and silt lenses. The neck functions to depress the phreatic water surface and insure the drying of the formation beyond the vertical axis of drain conduit. The neck is usually installed inclined, but in special cases it could be vertical. The invention also contemplates the use of a supplementary apron along the outer side; i.e., towards the hill toe, of the drain conduit assembly essentially to channel any ground water received within the environment of the chamber into the drain conduit. Furthermore, the apron functions to restrict the passage of water beyond the drain conduit to the toe section of the hillside.

DESCRIPTION OF THE ILLUSTRATED EMBODIMENTS

Figure 1:
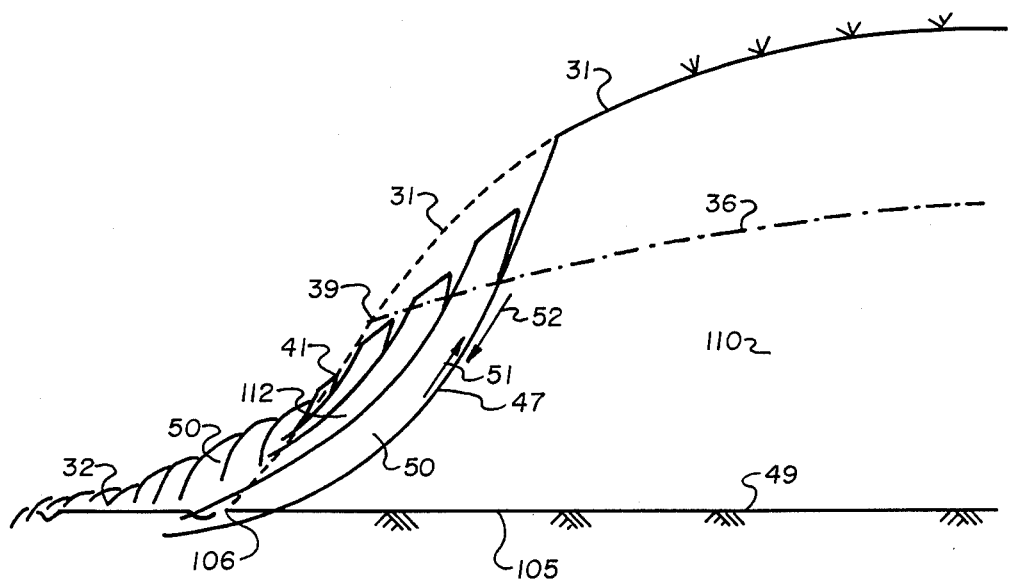
FIG. 1 is a cross-sectional view of a landslide potential situs showing the various critical layers or levels in the hillside.

A drainage system 29 in accordance with the instant invention is contemplated for installation in hillsides 31 having a slope in excess of 20° from the horizontal, although installation of this invention is not restricted from any hillside having a lesser incline. Placement of the drainage system is generally contemplated as a protective and remedial measure for installations located at the foot of the hillside, e.g. highway 32. Typically a hillside 31 includes a phreatic water level 36 which is defined as the level of ground water which may be reached by a well or a piezometer. In those cases when the location of the phreatic water level is somewhat indefinite, the drainage system is directed for installation within a water saturated region of the hillside.

As shown, phreatic water surface 36 slopes downward as it reaches the face 39 of the hillside 31. The face of the hillside 39 includes a seepage face 41 which generally defines openings or outlets for ground water to egress the hillside face 39. A failure surface 47 is generally defined along an inclined curved surface which is somewhat removed from the face of the hillside. A failure surface 47 is the surface along which slough material 50, formerly constituting the outermost portions of the hillside, has been detached from the hill 31. The exact location of the failure surface 47 is a function of the type of material constituting the hillside, the amount of ground water flow, the permeability of the hillside material, the stratification of the hillside formation, the depth of the impermeable layer, the slope of the hillside, and the natural stability of the hillslope.

The hillside 31 as illustrated may also include an impermeable layer 49 shown in a substantially horizontal configuration. The impermeable layer is an essentially less permeable geological strata which serves to confine water from further downward flow. The impermeable layer may be located anywhere from below the toe up to anywhere in the hill. Though the layer is illustrated as being essentially horizontal, this is not a restriction in that other configurations are in existence.

A drainage system constructed in accordance with this invention anticipates draining excess water to maintain the stability of the slough material 50 such that the resistant force 51 is equal to or greater than the driving force 52 acting along the failure surface 47 of the hillside 31.

The drain means 29 of this invention generally includes a drain pipe 53 which is typically circular in cross-section and cylindrical in total configuration, though other configurations are within contemplation. Among the other configurations is an assemblage of a plurality of drain pipes. For example, a drain pipe 53 may be replaced by a series of parallel drain pipes of smaller radius positioned in close proximity. The drain conduit typically includes a series of perforations, generally 55, which are placed around the major portion of the circumference of the pipe and permit an intercommunication of the exterior 56 of the pipe with the hollow interior 57 of that pipe. Generally the holes or perforations 55 are large enough to permit water flow from the environment of the pipe. The cross-section of the perforations may vary both as to shape and dimension.

Figure 2:
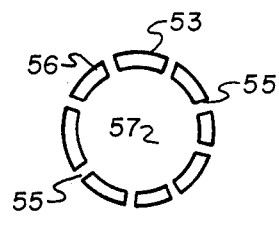
FIG. 2 is a cross-sectional view of the drain conduit of the invention.
Figure 2A:
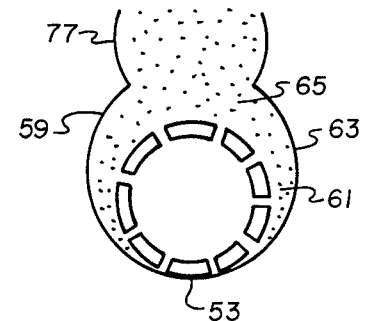
FIG. 2A is a cross-sectional view of a drain conduit of the invention in association with a saddle section and neck.

As shown in FIG. 2A, the drain pipe is fitted with a saddle-type channeling section 59. Typically, this saddle section is constructed to essentially surround the drain pipe 53 and thus increase the seepage velocity and facilitate the movement of ground water into the drain pipe. The saddle section 59 may be generally cylindrical in configuration. In particular, the saddle section is generally contemplated as being a chamber 61 defined by the walls 63 of a hole bored into the hillside 31. The interior of the chamber is optionally filled with sand or gravel 65 of varying dimensions to effect the filtering process. Generally, this filtering means includes a collection of sand or gravel particles of sufficient dimension to preclude the entrance of large particles into the pipe or into the perforations of the pipe. This results in a means of preventing clogging or silting of the pipe and thus attempts to prevent frustration of the drainage function of the pipe. Typically, the filtering means extends along the total length of the pipe 53 and thus provides a means of insuring the viability of the pipe as a drainage means.

The drain pipe 53 is positioned essentially horizontally within the hillside 31 such that its longitudinal axis 67 at any point along the pipe 53 is substantially parallel to the face 31 of the hillside immediate or most proximate the point, i.e. the pipe is essentially tangent to the contour line 69 of the hillside 31.

Figure 3:
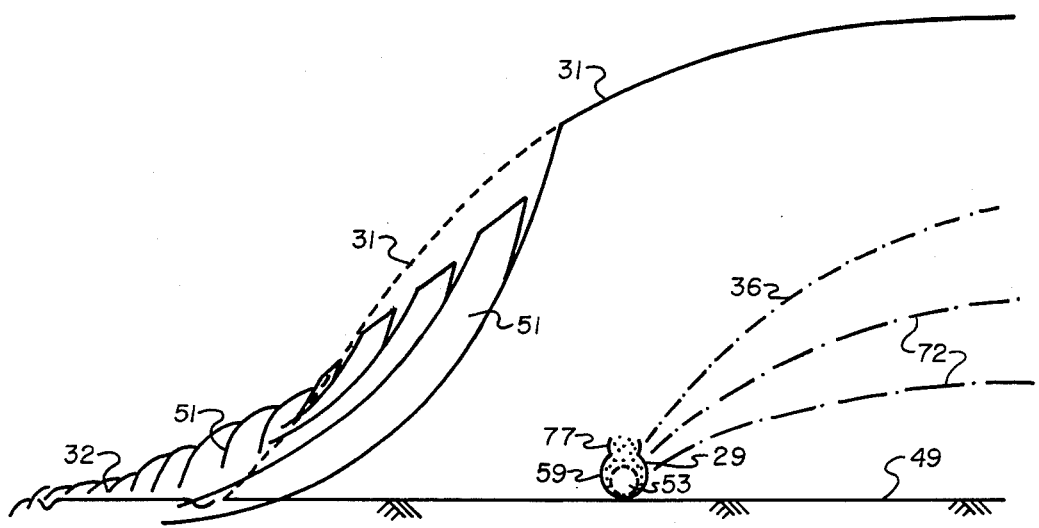
FIG. 3 is a cross-sectional view of a hillside illustrating the placement of a drain system of this invention.

As shown in FIG. 3, the drain pipe 53 is typically placed on or above the impermeable layer 49 of the hillside 31, i.e. (if the impermeable layer exists). Furthermore, the pipe 53 is positioned substantially perpendicular to flow nets 72 so as to effect a depression of the phreatic surface 36 and prevent that water surface's penetration beyond the vertical axis 74 passing through the center of the drain pipe and to the failure surface 47 of the hillside.

Figure 5:
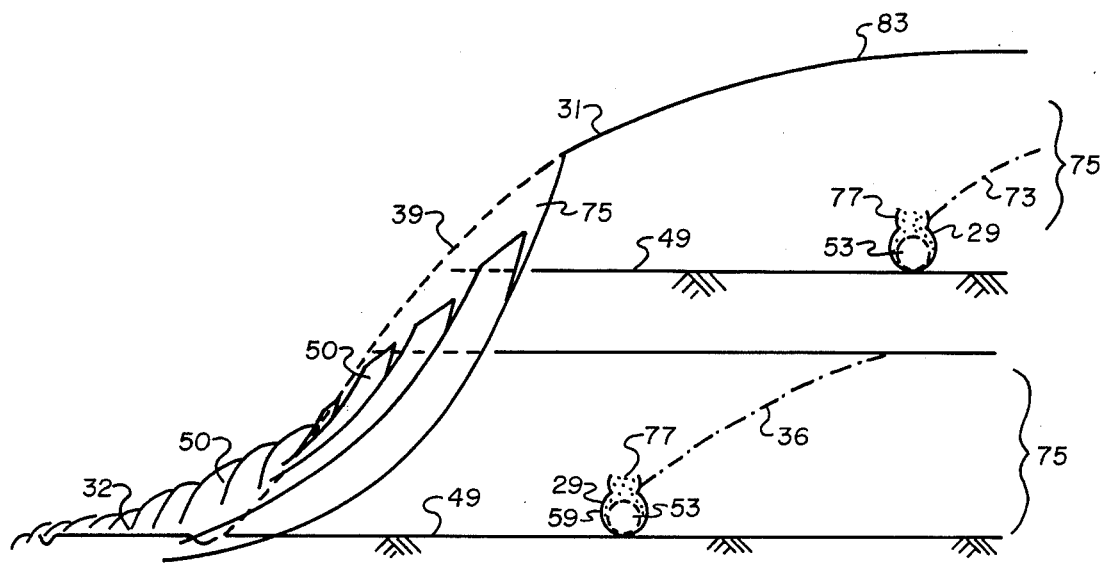
FIG. 5 illustrates the placement of a plurality of drainage conduits to effect the drainage of a layered soil hillside.

In the event that the hillside 31 includes more than one impermeable layer 49, a plurality of drainage pipes 53 may be positioned within the hillside as shown in FIG. 5 with one drainage means being placed above each impermeable layer. This configuration results in a depression of the separate and distinct phreatic water tables 36 (perched water) found in each strata 75 as defined by the impermeable layers. This construction results in a frustration of sloughing or collapse of the hillside face 39 which may be occasioned by the phreatic water surface 36 reaching the failure zone 75 and saturating the material of that zone so as to reach the critical factor of safety ($F_S$).

The invention also contemplates the use of a substantially inclined or vertical neck 77 above the saddle section 59 to facilitate the drainage of less permeable formations, layered formations, or fractured rock geological structures.

The neck (inclined or vertical), consists of an extension or chamber positioned superior to the saddle section 59. In one construction, the neck may include a series of essentially cylindrical chambers oriented in a substantially overlapping arrangement. The height of this neck depends on the permeability of the formation, extent of fractures, location of soil lenses, and the amount of groundwater flow. The neck 77 typically extends substantially along the total length of the drain conduit 53. In operation, the neck 77 provides an expanded directional means for not only gathering water flow from the area surrounding the drain pipe 53 and accelerating it into the drain pipe but also preventing water from passing beyond the vertical axis 74 of the drain pipe. The neck 77 is positioned to essentially intercept the water flow nets 72 at an approximately 90° angle all the way up to the new phreatic water surface (the depressed phreatic water surface). Because the neck 77 extends essentially parallel to the face of the hillside 31, and a sufficient distance above the drain pipe 53 to permit a sizable egress means for water running in the flow nets 72, the neck 77 provides hydraulically a very efficient means for handling a rapid flow and thereby effects a speedy draining of the hillside.

The neck 77 anticipated by this invention does not intercommunicate with the crown 83 of the hillside 31. It is desirable not to interfere with nor interrupt that portion 85 of the hillside which interconnects the two sections 87, 89 of the hillside which are located on either side of the central vertical axis 74 of the saddle 59. The material in hillside portion 85 serves to bind or anchor the two sections 87 and 89 and thus retain some of the cohesive forces extant between the two sections, and maintain the hill face stability.

The neck 77 may be constructed to attain any height depending upon the nature of the material composing the hillside 31. Typical constructions contemplate a height ranging from approximately a few inches upwards to three or four feet, (in special cases even more) over a drain pipe 53 length of 100 to 1,000 feet. Such a structure may effectively stabilize a hillside having a height of several hundred feet or more.

Figure 6:
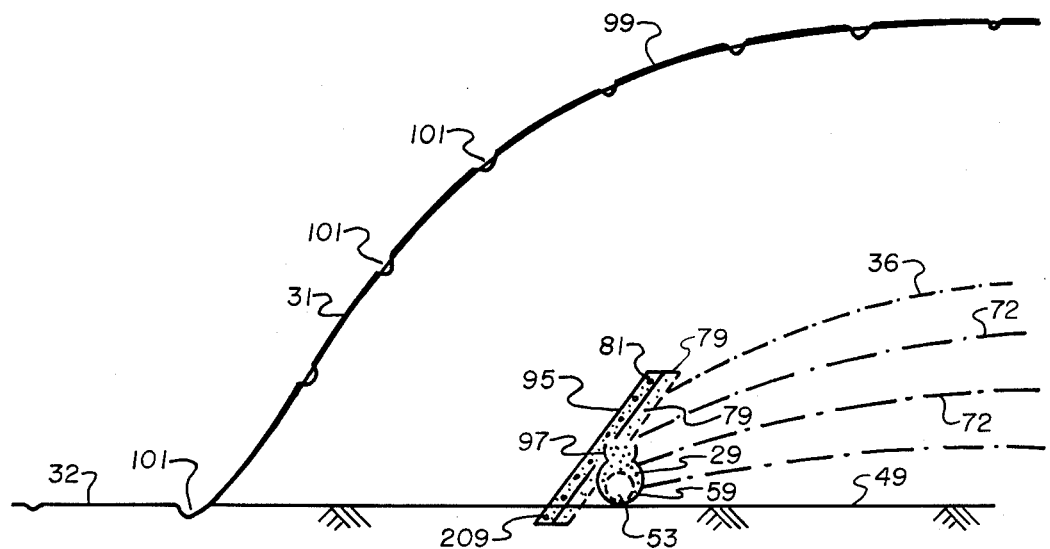
FIG. 6 is a cross-sectional view of a hillside illustrating the drain conduit in conjunction with an inclined concrete (or reinforced concrete) apron as detailed by this invention, the surface collector drains and waterproof sheeting material are also shown.
Figure 7:
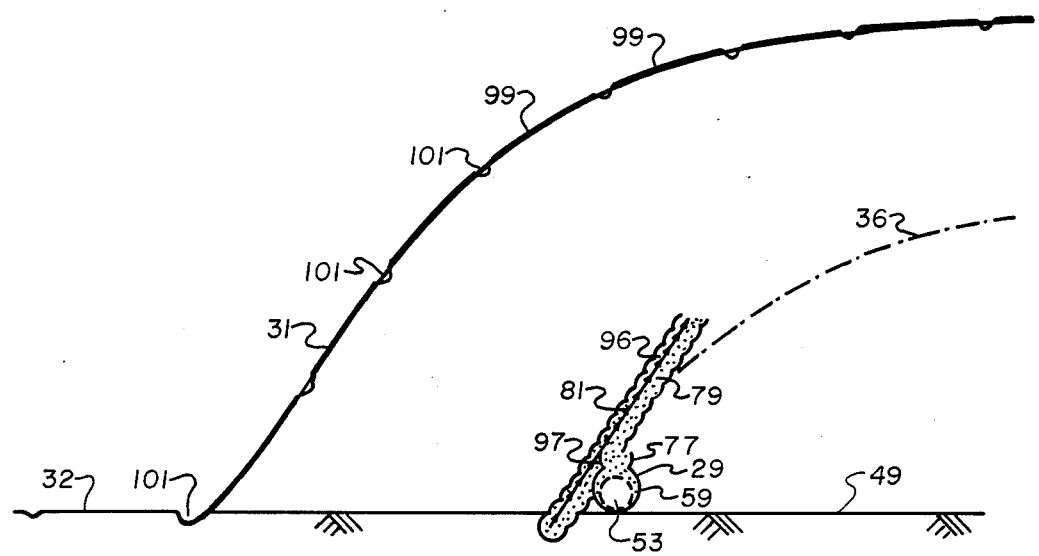
FIG. 7 is a cross-sectional view of a hillside showing the placement of a drain conduit in conjunction with a sheet metal apron inclined from the vertical The figure also shows a cross-sectional view of the metal sheet apron.
Figure 8:
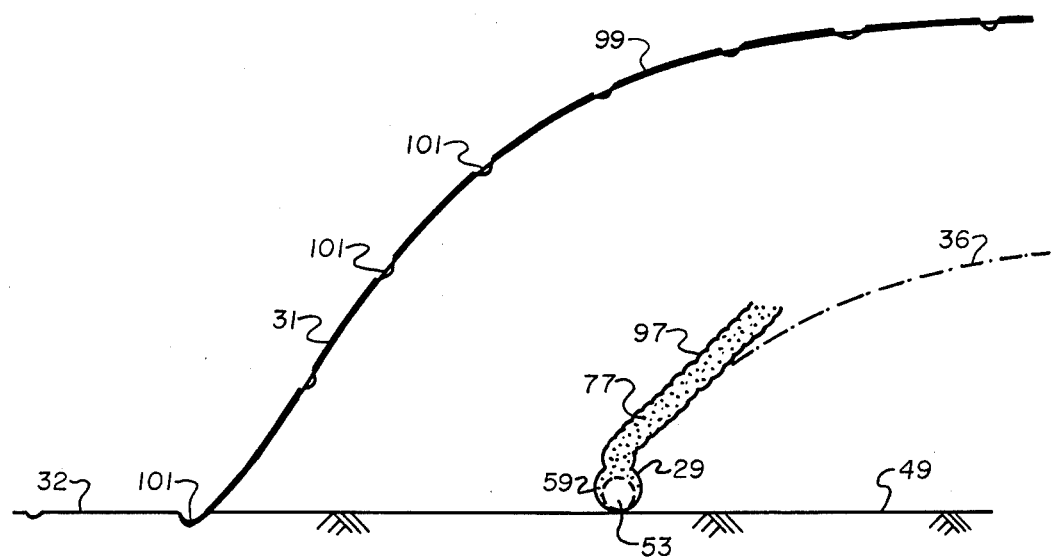
FIG. 8 is a cross-sectional view of a hillside showing the placement of a waterproof material along the hillside in conjunction with surface collector drains. Furthermore, the figure illustrates a particle-filled neck inclined from the vertical above the drain conduit according to the details of this invention.
Figure 9:
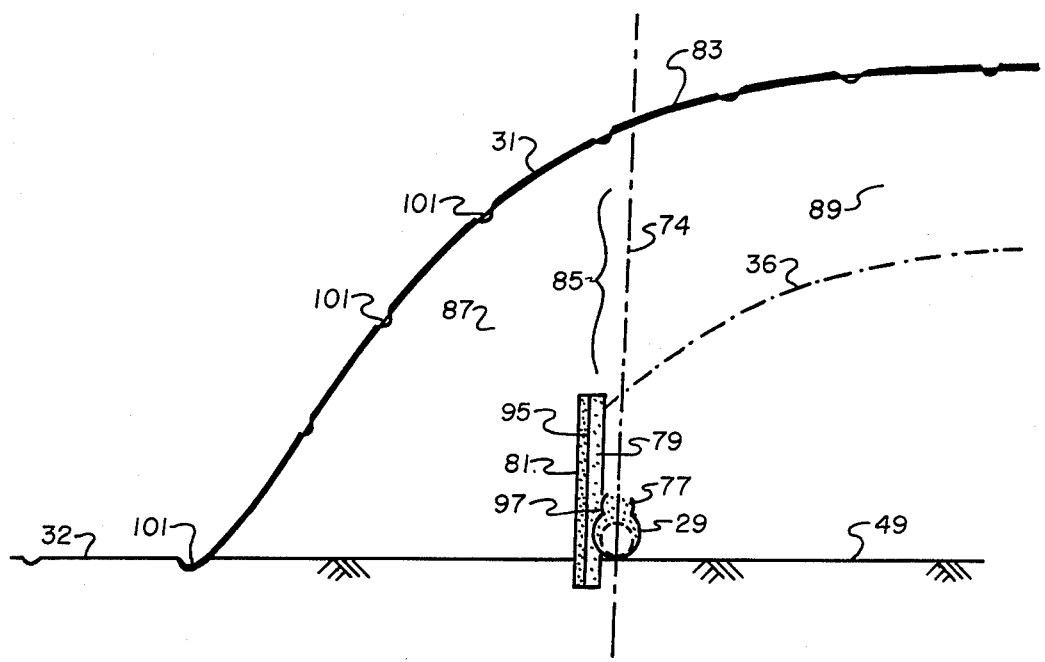
FIG. 9 is a side view of a hillslope showing the installation of a drain conduit of this invention in association with a saddle section and a vertical apron.
Figure 10:
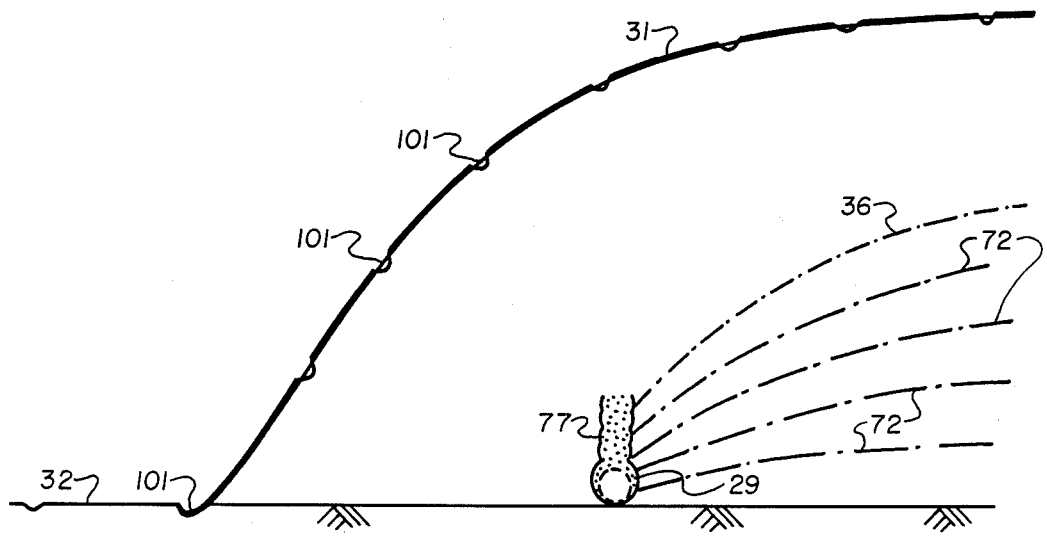
FIG. 10 is a side view of a hillslope showing the installation of a drain conduit of this invention is association with a saddle section and a vertical neck.

The invention also contemplates an embodiment wherein neck 77 is filled with sand and/or gravel so as to essentially define a filtering means 78. Additionally, the function of neck 77 may be supplemented by a substantially nonporous apron means 95 positioned essentially inclined along the wall 97 of the neck 77, and extending along the length of the neck 77. A typical construction includes a permeable layer 79 in conjunction with a substantially impermeable layer 81. Of the two layers, the impermeable layer is positioned toward the hillface 31. Preferred embodiments include a concrete, cement grouting, or reinforced concrete apron as shown in FIGS. 6 and 9 respectively. Alternate constructions may include a rigid upstanding impermeable layer 81 fabricated from sheet metal together with a permeable layer 79 as shown in FIG. 7. Other constructions may include a plastic sheet or similar impermeable material. Although the positioning of the apron in a substantially inclined orientation is preferred, alternate constructions include substantially vertical apron placements such as those illustrated in FIG. 9. As also shown in FIG. 9, the association of a rigid, upright, impermeable apron 95, drain pipe 53, neck 77 and the impermeable geological layer 49 defines a generally "L"-shape cross sectioned pocket which is elongate in configuration.

Figure 4:
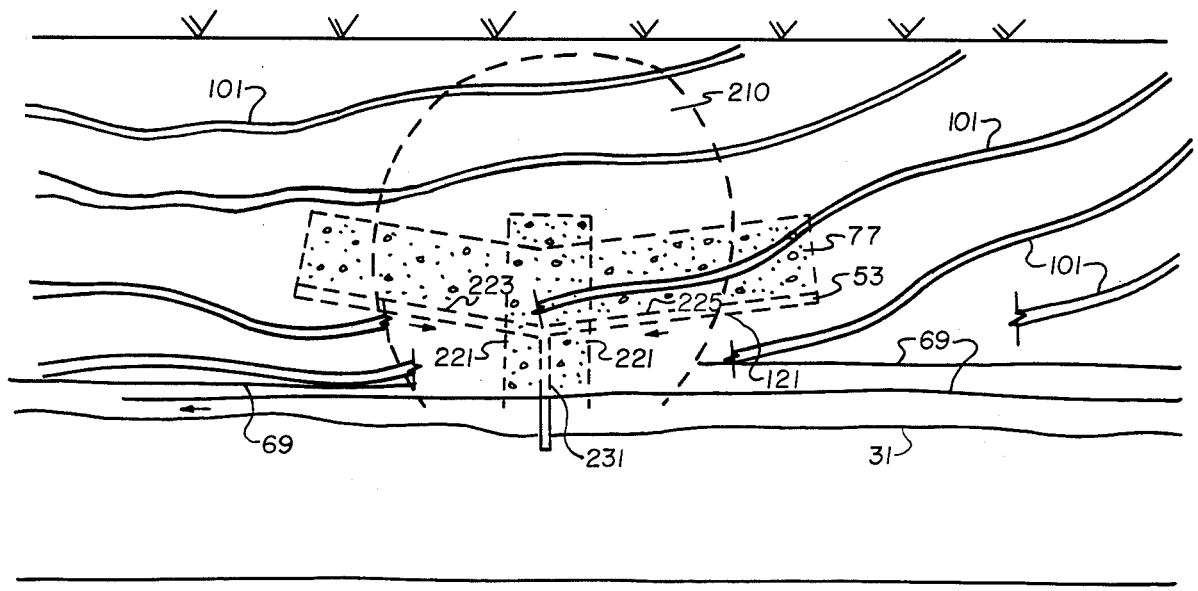
FIG. 4 is a front view of a hillside showing the placement of a waterproof material on the hillside in conjunction with surface collector drains positioned parallel to the contour lines along the hill face.

The drain system 29 construction may be supplemented with the placement of a vinyl-coated nylon sheet 99 on the hillside surface 31. Though the nylon sheet is preferred, any substantially water impermeable or semi-impermeable sheeting would effectuate the results sought. The sheeting 99 may be accompanied by the construction of surface collector drains 101 cut into the face of the hillside 31. As shown in FIG. 4, these drains are positioned substantially parallel to the contour lines 69 of the hillside 31 in a manner well known in the art.

Installation of the drain system involves a preliminary investigation of the groundwater regime, soil lenses, permeability of the formation, location of the phreatic water surface (if not present, the saturated zone), direction of water movement, thickness and location of any impermeable layers, and other physical properties of the formation. This investigation permits the user to ascertain the proper situs for locating the drain. Optionally, the drain pipe 53 should be located within the interior region of the hillside 110 bordered by the phreatic water surface 36 (or inside of the saturated zone), the hillside surface 47 and the impermeable geological layer 49. The region as described is not necessarily circumscribed by the identified parameters. Typically, the situs should be chosen so as to be above the impermeable layer 49 (if such a layer is present) and below the phreatic water surface 36. The system may be placed in the region defined by the hillface 31, the phreatic water surface 36, and the impermeable layer 49 (if the impermeable layer is not present, the horizontai line 105 extending from the toe 106 of the hill face defines the lower boundary).

Figure 12:
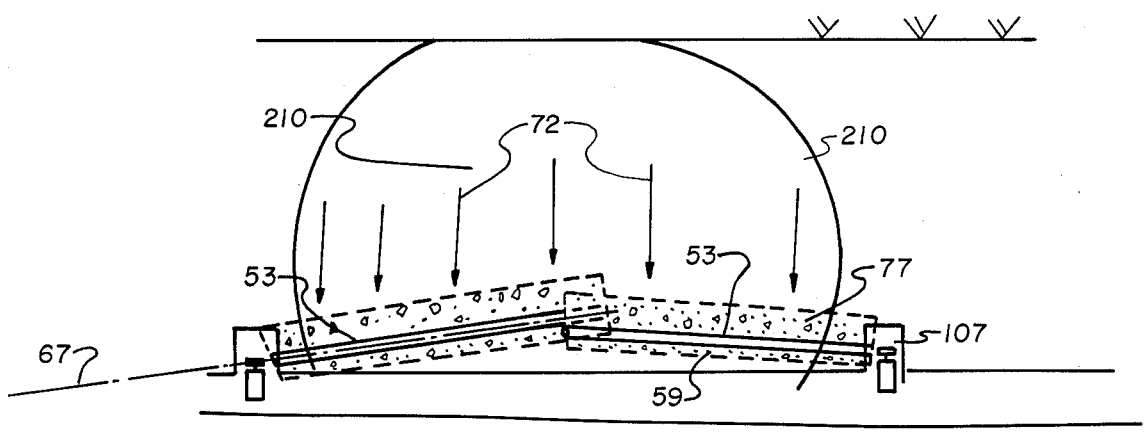
FIG. 12 is a front view of a hillside illustrating the installation of a drainage means as installed during the occurrence of a large landslide. The figure shows an installation of a plurality of drainage means of this invention, each drainage means being inserted from an opposing side of the occurring landslide.
Figure 13:
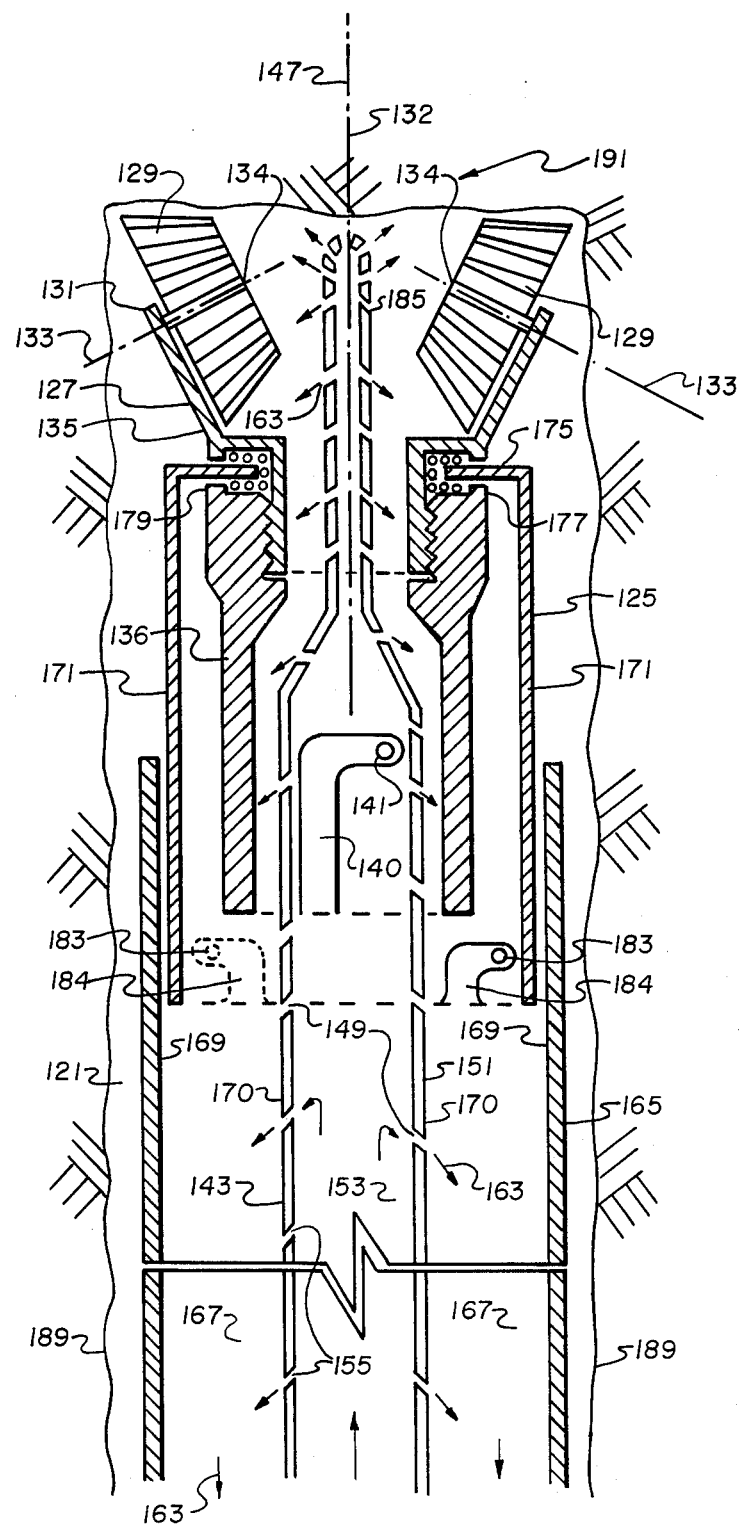
FIG. 13 is a cross-sectional view of installation equipment for installing the drain conduit.
Figure 14:
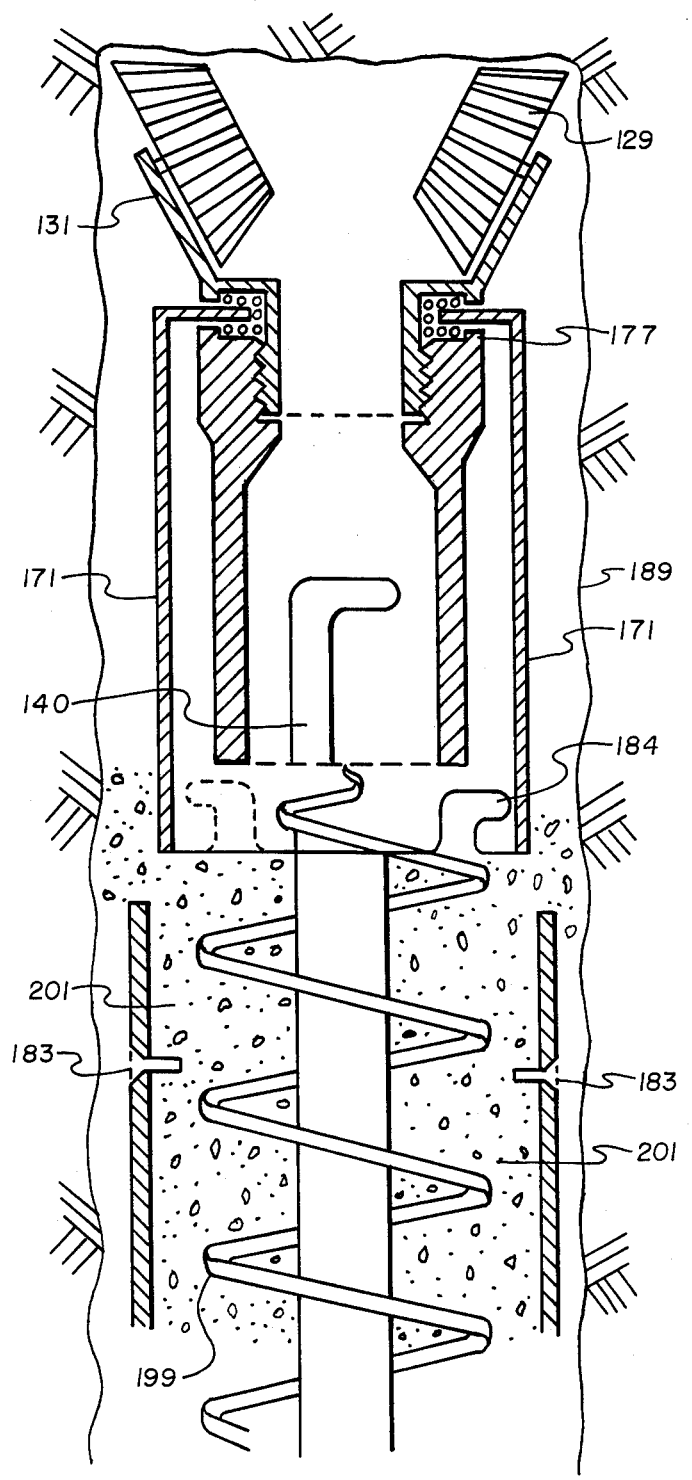
FIG. 14 is a cross-sectional view of a filter-injecting apparatus utilized in the installation of the drainage means.
Figure 15:
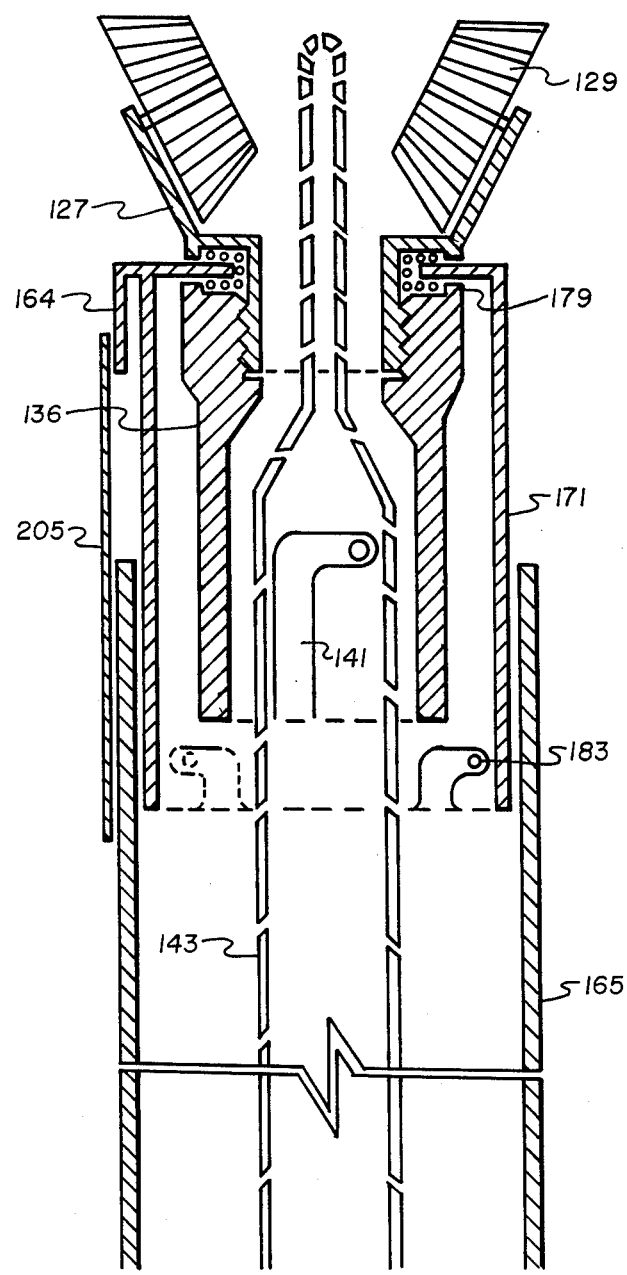
FIG. 15 is a cross-section view of an apron-installing apparatus utilized to install an apron consisting of a series of metal plates, preferably made interconnectable.
Figure 16:
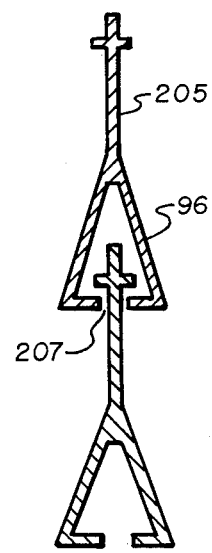
FIG. 16 is a side view of a pair of interconnected metallic apron sections.

Initial construction of the drainage system may require an excavation 107 into the hillside 31 as shown in FIG. 12. Typically, this excavation 107 is made by large earth-moving equipment, e.g. a bulldozer. The excavation 107 is of sufficient dimensions to receive drilling and drain installation machinery. Moreover, the excavation 107 penetrates the hillside 31 a distance 115 approximateiy equivalent to the contemplated penetration 117 of the drainage system 29 into the hillside 31.

The housing for the drainage system 29 is constructed by boring a series of holes 121 through the hillside 31, parallel to the hillside face 31, i.e. tangent to the contour lines 69. In those embodiments which include a drain pipe 53, generally only one bore hole 121 having approximately the same cross-section as the drain pipe 53 is required. In the embodiment whicn includes a drain pipe in association with a saddle section, a bore hole 121 having a cross-section considerably larger than that of the drain pipe may be required. In those embodiments which contemplate a neck 77 above the drain pipe 53, a first bore hole having a cross-section larger than the cross-section of the drain pipe functions as a housing for the drain pipe 53. A series of overlapping bore holes 121 is drilled superior to the first bore hole, thereby defining the neck 77. Alternatively, the orientation of the holes could be inclined.

The construction of the boreholes 121 and the subsequent implantation of the drainage system 29 is accomplished by means of a drilling unit 125 adapted for operation within the narrow hillside excavation 107. The drilling unit 125 is equipped with a plurality of drill bits 129. Drill bits 129 are positioned on the forward end 131 of the unit 127 and inclined away from the longitudinal axis 132 of the drill unit 125. The bits 129 are made rotatable about axes 133, which axes are defined by drilling unit stem 134. The bits 129 are fabricated from material of sufficient hardness to cut through rock, soil or other material typically composing a hillside.

A rod support 136, which is generally hollow and cylindrical in configuration is fixedly mounted on drilling unit stem 135. Rod support 136 is adapted with a plurality of slots 140 therein dimensioned to receive individually a respective fluid rod pins 141. Pins 141 is secured to an essentially cylindrical hollow power-driven fluid rod 143 which is positioned within slots 140 made in the interior of rod support 136. The fluid rod 143 is adapted to rotate about its centerline axis 147. The fluid rod's motion is transmitted through intermediation of the fluid rod pins 141 to the rod supporter 136. In turn, the rod support 136 also rotates about its centerline axis 147, thereby effecting a corresponding rotation of the drill bits 129.

Fluid rod 143 is adapted with a plurality of spaced perforations 149 within the walls 151 thereof. The perforations 149 intercommunicate with the interior 153 of the fluid rod 143. As shown, the perforations 149 may be defined by angulated openings 155 in sidewalls 151. The fluid rod 143 is configured to receive a pressurized flow of fluid, e.g. water or air through the interior 153 thereof, which flow is channeled through the various perforations 149 to effectively flush out the interior of the drilling unit 125. The action of the fluid flow functions to remove the bored-out hillside material generated by the drill bits 129 drilling action against the hillside 31. The essentially fluid-material mixture is directed along the outer sides of the fluid rod 143 as indicated by directional arrows 163. This directional function is facilitated by a hollow solid-walled support pipe 165. Pipe 165 is essentially cylindrical in configuration and substantially encases the fluid rod 143, thereby defining a channel 167 between the interior wall 169 of the pipe 165 and the exterior wall 170 of fluid rod 143.

Pipe 165 is supported by an auxiliary pipe 171, which auxiliary pipe serves to connect pipe 165 to the main body of the drilling unit 129. Auxiliary pipe 171 is mounted so as to be free floating. This mounting does not translate the rotation of the drilling unit 129. Specifically, auxiliary pipe 171 includes a lip portion 175 which is dimensioned to be received within a recess cavity 177 formed by the conjunction of drilling stem 133 and rod support 136. The recess cavity 177 is lined with bearings 179, e.g. ball bearings, which function as a substantially frictionless mounting bed for the auxiiary rod lip 175. The auxiliary rod 171 is secured to the pipe 165 by means of pins 183 located in slots 184. In a preferred embodiment, fluid rod 143 includes a reduced diameter forward section 185 which is interposed between the plurality of drilling bits 129 so as to provide fluid to the face 191 of the material being drilled.

Pipe 165, being a solid-walled pipe, also functions to protect the bored hole 121 from being enlarged by the action of the fluid flow while also preventing the collapse of portions of the hillside 189 bordering the bored hole 121.

Upon the completion of the boring or drilling, the fluid rod 143 is released from the rod supporter 136 by disconnecting pins 141 from their respective slots 140. Subsequently, the fluid rod 143 is retracted from the hole 121. The drill bits 129 and rod supporter 136 are left in the bored hole 121. The drain pipe 53 is inserted within the interior of the solid-walled pipe 165 after which the solid pipe 165 is retracted. After installation of the drain pipe 53, a second hole may be bored on the top of it and after retraction of fluid pipe and release of the solid pipe 165, the auger 199 is inserted in and filter material is then injected into the second hole (to fill the saddle and half the cross-sectional area of the second hole) by means of the auger to form the filter. As the filter is placed, the solid pipe 165 and the auger 199 are gradually retracted from the bored hole 121.

Installations requiring the neck 77 to be filled with a filtering means 65 are effected by using the solid-walled pipe 165. Subsequent to the completion of drilling, the pipe 165 is disconnnected from the main drilling unit and allowed to remain in place as the fluid rod 143 is retracted. An auger 199 is then inserted into a neck bore hole 121 by means of the hollow interior of solid pipe 165. Sand and/or gravel particles 201, typically having diametric dimensions in the range of approximately 0.5 to about 10 millimeters, are then injected into the hole by means of the auger 199. As the filter material enters the neck from the end of pipe 165, the solid-walled pipe 165 and the auger 199 are gradually retracted.

In those installations involving a series of borings 121 positioned in an overlapping fashion, one atop another, to establish the neck 77. An alternate process for injecting the filter material is available. The filtering particles 201 may be injected through the most superior positioned bore hole 202 and thus fill the neck 77 in one operation as opposed to repeating the filter injecting process at each overlapping bore hole 121.

The constructions involving an inclined apron 95 contiguous the neck 77 require a more elaborate installation technique. The metal sheet apron 81, illustrated in FIG. 7, is installed by attaching sections of the apron 205 to the plate supporter 164.

As the drilling unit 129 proceeds into the bore hole 121, additional sections of the apron 205 (metal plates) are interconnected and fed into the hole. Upon completion of the drilling, the metal plates 205 remain in the bore hole to form the metal sheet 81. In those embodiments contemplating a multi-layer arrangement of bore holes 121, the apron is provided with a notch 207, as shown in FIG. 7, whereby each succeeding layer of the apron 205 is made interconnectable to the layer positioned immediately inferior thereto.

Figure 11:
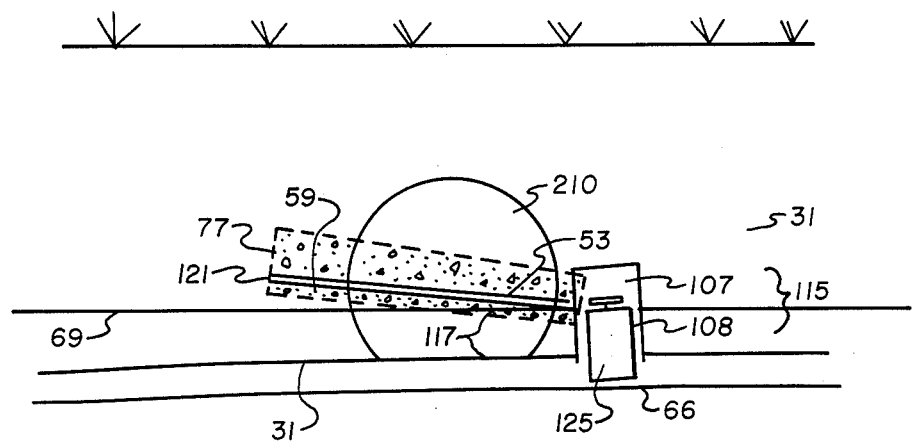
FIG. 11 is a front view of a hillside showing the installation therein of a drain conduit from one side of the slide area. The figure illustrates an incision or sectional portion of the hillside cut away by an earth-moving vehicle.

The concrete portions of the aprons 209 are installed in approximately the same manner as the particle filter 65, i.e. the concrete or cement is injected by means of an auger 199 positioned in the boring 121 subsequent to the initial drilling operation. The filter section of the apron is installed subsequent to the curing of the concrete apron 209. The concrete section of the apron might be formed by cement grouting positioned subsequent to the drilling of bore holes. The invention contemplates the installation of the filter in this embodiment to require a drilling of a neck 77 contiguous to the cured concrete apron 209 and the subsequent filling of that neck 77 with filtering particles 201. Drain installations typically are initiated from the side of the land slide (FIG. 11). This approach permits the drain's installation while the slide 210 is in progress. After the drain pipe is installed, a piece of solid pipe is attached to the end of drain pipe 53 and extended normally out from the hill face to form the drain outlet. If the slide is extensive, construction may be done from both sides of the slide (FIG. 12). This approach initiates the construction from a location out of the flow path of the slide. In special cases, the drain installation may be started from the center of the slide 210 with drain pipes 223, 225 being located on both sides of the excavation 221 (FIG. 4). In this case a "T"-connector pipe 231 could be used as the outlet of the two drain pipes 53.

Subsequent to the installation of the drains, the excavation 107 may be filled with gravel or similar filtering material so as to reconstitute the initial configuration of the hill face.

I claim:

1. An apparatus for draining groundwater from a water saturated zone of a hill having contour lines associated therewith, a failure surface and an impermeable substantially horizontal geological positioned below said water saturated zone, said system consisting of:

a pair of first, cylindrical elongate horizontal bore within said hill, said first bores being oriented parallel to a hill contour line and remote from a failure surface of said hill, each of said first bores having a proximal end and a distal end, each of said proximal ends being positioned laterally from a failure surface of said hill whereby said proximal end is outside of a flow path of slough material which has detached itself from said hill along said failure surface, each of said distal ends bieng positioned within said hill within said saturated zone;

a plurality of second, cylindrical elongate horizontal bores within said hill associated with each first bore, each of said second bores being oriented parallel to a hill contour line and remote from said hill failure surface, each plurality of said second bores having said second bores positioned one above another and above a respective first bore wherein each second bore overlaps an adjacent second bore whereby each second bore communicates with each adjacent second bore, one of said second bores overlapping a respective first bore;

an upright region of said hill positioned above each uppermost second bore and below an exterior surface of said hill, said upright region being retained undisturbed and in situ whereby said upright region retains its natural anchorage and cohesion action between said hill and face of said hill;

an association of said plurality of second bores defining a pair of upstanding necks one of said necks extending from each said first bore upwards, said necks being each inclined from an imaginary vertical line passing through said first bores;

a rigid, upstanding, impermeable elongate apron positioned along an upstanding wall of each said neck and extending along a length of said neck region wherein each said apron is positioned sufficiently below said upright hill region to retain said region undisturbed and in situ;

a conduit means having porous walls adapted to receive fluid from without said conduit means and convey said fluid along a predetermined path, said conduit means being positioned within each of said bores, substantially horizontally and within said hill remote from a failure surface of said hill wherein a longitudinal axis of said conduit means is substantially parallel to the contour lines of said hill;

outlet means mounted on said conduit means for continuously directing fluid from said conduit means and conveying that fluid to a location away from said hill;

wherein each of said first bores is positioned adjacent said impermeable strata and below said saturation zone and each respective said apron intersects said strata whereby said geological strata and said aprons form a pair or geological "L"-shaped cross sectioned impermeable pockets within said hill to entrap groundwater and channel said groundwater to said conduit means.

2. A method for stabilizing a hillside face of a hill containing a water table, said method comprising:

drilling a first horizontal elongate hole into said hillside below said water table, said first hole being oriented parallel to said hillside face;

drilling a plurality of second holes into said hilside, each of said second holes being positioned one above another and each second hole interconnecting with an adjacent second hole, one of said second holes inter-communicating with said first hole, each of said second holes being oriented parallel to said hillside face; an association of said first hole and said second holes defining a hollow substantially upright chamber inclined from a vertical line passing through said first hole, said chamber having a floor, a ceiling and vertically inclined sidewalls defined by said hillside, an uppermost second hole being positioned sufficiently below said hillside face that an upright region of said hill positioned above said uppermost second hole is retained undisturbed and in situ whereby said upright region retains its natural anchorage and cohesion action between said hillside and said hill;

placing an elongate, hollow pipe within said first hole, said pipe having a smaller diameter than a diameter of said first hole, said pipe having a sidewall which defines a hollow inner channel, said sidewall having a plurality of perforations therein about the entire surface of said sidewall which communicate with said inner channel, said pipe being positioned parallel to said hill face;

injecting a rigid, impermeable, elongate apron into said first and second holes and positioning said apron proximate a sidewall of said chamber which is most proximate said hill face, and positioning said apron to extend along a length of said chamber; said apron being positioned to be inclined from an imaginary line passing through said first hole;

filling chamber with filter materials;

continuously draining water, received within said pipe, outward and away from said hill.

3. The method of claim 2 wherein said hill has an impermeable geological strata therein and said first hole is constructed adjacent and atop said impermeable geological strata and said apron is constructed to intersect said impermeable geological strata, wherein said apron in association with said impermeably geological strata forms an impermeable, elongate "L" shaped cross-sectioned drainage pocket within said hill.

4. The method of claim 2 wherein said second hole is constructed adjacent an imaginary horizontal line which intersects a toe of said hill ahd said apron is constructed to intersect said imaginary line.

5. The method of claim 2 wherein said apron is formed by injecting concrete into said first and second hole to form an upright wall adjacent that said chamber sidewall which is most proximate said hillside face.

6. The method of claim 2 wherein said apron is rigid and is formed by inserting a metal sheet into said chamber and positioning said sheet upright and inclined from an imaginary vertical line passing through said pipe, said sheet being positioned proximate said chamber sidewall which is most proximate said hillside face.

7. The method of claim 2 wherein said apron is formed by inserting a plurality of individual metal sheets adapted to interconnect one to another into said chamber and positioning and interconnecting said sheets to form an upright assembly proximate said chamber sidewall which is most proximate said hillside face, said assembly forming an apron which is inclined from an imaginary vertical line passing through said pipe.

8. The method of claim 2 wherein said apron is constructed to be oriented upright and parallel with an imaginary vertical line which passes through said pipe.

9. The method of claim 2 wherein said chamber is constructed within said hill away from a potential failure surface of said hillside face.

10. In a hill having a hillside face and a water saturated zone, a drainage apparatus for stablilizing said hillside face of said hill, said apparatus comprising:

a first, cylindrical elongate horizontal bore within said hill, said first bore being oriented parallel to said hillside face;

a plurality of second, cylindrical elongate horizontal bores within said hill, each of said second bores being oriented parallel to said hillside face, each of said second bores being positioned one above another and above said first bore whereby each second bore overlaps an adjacent second bore, whereby each second bore communicates with each adjacent second bore, one of said second bores overlapping said first bore;

an upright region of said hill positioned between an uppermost second bore and an exterior surface of said hill, said upright region being retained undisturbed and in situ whereby said upright region retains its natural anchorage and cohesion action between said hillside and said hill;

an association of said second bores defining an upstanding neck which extends from said first bore upwards, said neck being inclined from an imaginary vertical line passing through said first bore;

a rigid, upright, impermeable elongate apron positioned along an upstanding wall of said neck and extending along a length of said neck region;

wherein said apron is positioned sufficiently below said upright hill region to retain said region undisturbed and in situ;

an elongate pipe having a sidewall which defines a hollow inner channel, said sidewall defining a plurality of perforations wherein said perforations communicate with said inner channel, said pipe being positioned within said first bore and oriented parallel said hillside face;

outlet means mounted on said pipe for continuously directing water from said pipe and conveying that water to a location away from said hill.

11. The apparatus of claim 10 wherein said hillside includes an impermeable geological strata positioned below a potential water saturated region and a water table and wherein said first bore is positioned adjacent said impermeable strata and below said water table and said apron intersects said strata, said geological strata and said apron forming an "L" shaped impermeable pocket within said hillside to entrap ground water and channel said ground water to said perforate elongate pipe.

12. The apparatus of claim 10 wherein said first bore is positioned adjacent an imaginary horizontal line which passes through a toe of said hillside, and said apron intercepts said imaginary line.

13. The apparatus of claim 10 wherein said apron is formed of concrete.

14. The apparatus of claim 10 wherein said apron is formed of at least one sheet of metal.

15. The apparatus of claim 10 wherein said apron is formed of a plurality of metal sheets adapted to interconnect one with another to form a solid, impermeable upstanding sheet.

16. The apparatus of claim 10 wherein said first bore and said neck is filled will particle filter material.

17. The apparatus of claim 15 wherein said filter material is sand and gravel.

18. The apparatus of claim 11 wherein said apron extends downward through and below said impermeable strata.

* * * * *